United States Patent
Dutil et al.

(10) Patent No.: US 6,846,584 B2
(45) Date of Patent: Jan. 25, 2005

(54) PROCESS FOR GENERATING ELECTRICITY WITH A HYDROGEN FUEL CELL

(75) Inventors: Frédéric Dutil, Québec (CA); Jean Ruel, Québec (CA)

(73) Assignee: CO2 Solution Inc., Val-Belari (CA)

( * ) Notice: Subject to any disclaimer, the term of this patent is extended or adjusted under 35 U.S.C. 154(b) by 195 days.

(21) Appl. No.: 10/195,186

(22) Filed: Jul. 12, 2002

(65) Prior Publication Data

US 2003/0027023 A1 Feb. 6, 2003

(30) Foreign Application Priority Data

Jul. 12, 2001 (CA) .............................. 2352626

(51) Int. Cl.[7] ................................................ H01M 8/18

(52) U.S. Cl. .............................. 429/19; 429/17; 429/34

(58) Field of Search ............................. 429/17, 19, 34

(56) References Cited

U.S. PATENT DOCUMENTS

| | | | |
|---|---|---|---|
| 4,537,839 A | 8/1985 | Cameron | 429/20 |
| 4,602,987 A | 7/1986 | Bonaventura et al. | 205/633 |
| 4,743,545 A | 5/1988 | Torobin | 435/41 |
| 4,761,209 A * | 8/1988 | Bonaventura et al. | 205/633 |
| 5,005,787 A | 4/1991 | Cullingford | 244/163 |
| 5,141,823 A | 8/1992 | Wright et al. | 429/19 |
| 5,248,567 A | 9/1993 | Amemiya et al. | 429/20 |
| 5,746,985 A | 5/1998 | Takahashi | 422/173 |
| 5,759,712 A | 6/1998 | Hockaday | 429/30 |
| 5,997,594 A | 12/1999 | Edlund et al. | 48/76 |
| 6,143,556 A | 11/2000 | Trachtenberg | 435/289.1 |
| 6,187,465 B1 | 2/2001 | Galloway | 429/17 |
| 6,221,117 B1 | 4/2001 | Edlund et al. | 48/76 |
| 6,299,744 B1 | 10/2001 | Narayanan et al. | 204/263 |
| 6,299,994 B1 | 10/2001 | Towler et al. | 429/17 |

FOREIGN PATENT DOCUMENTS

| | | |
|---|---|---|
| CA | 2002227 | 6/1990 |
| CA | 1291787 | 11/1991 |
| CA | 1294758 | 1/1992 |
| CA | 2222030 | 12/1996 |
| CA | 2291785 | 12/1998 |
| CA | 2322871 | 9/1999 |
| CA | 2332079 | 1/2001 |
| CA | 2326024 | 6/2001 |
| EP | 0376219 | 12/1989 |
| EP | 0677883 | 3/1995 |
| EP | 0700107 | 8/1995 |
| JP | 5 9184468 | 10/1984 |
| JP | 6 0035470 | 2/1985 |
| JP | 6 0241673 | 11/1985 |
| JP | 6 2170171 | 7/1987 |
| JP | 6 2274561 | 11/1987 |
| JP | 0 2206689 | 8/1990 |
| JP | 0 2301968 | 12/1990 |
| JP | 0 4051464 | 2/1992 |
| JP | 0 4190831 | 7/1992 |
| JP | 0 4337252 | 11/1992 |
| JP | 0 6044993 | 2/1994 |
| JP | 0 6275291 | 9/1994 |
| JP | 0 6333589 | 12/1994 |
| JP | 0 7169482 | 7/1995 |
| JP | 0 8069808 | 3/1996 |
| JP | 0 9204925 | 8/1997 |

(List continued on next page.)

*Primary Examiner*—Dah Wei Yuan

(57) ABSTRACT

The object of the invention is the coupling of a hydrogen fuel cell to an enzymatic process for the production of electricity and the transformation and sequestration of $CO_2$. Gaseous $CO_2$ emissions from processes such as hydrocarbon reforming are transformed into carbonate or bicarbonate ions and hydrogen ions by the enzymatic system in order to prevent their contribution to the greenhouse effect. The hydrogen ions resulting from the enzymatic process are recovered and combined in order to supply the hydrogen fuel cell. Finally, water, a by-product of the oxidizing reaction of the hydrogen fuel cell, is recovered and recycled back into the aqueous enzymatic system.

25 Claims, 1 Drawing Sheet

FOREIGN PATENT DOCUMENTS

| | | |
|---|---|---|
| JP | 1 0027621 | 1/1998 |
| JP | 1 1067251 | 3/1999 |
| JP | 1 1162488 | 6/1999 |
| JP | 1 1162495 | 6/1999 |
| JP | 1 1199202 | 7/1999 |
| JP | 1 1229167 | 8/1999 |
| JP | 1 1275965 | 10/1999 |
| JP | 2000251918 | 9/2000 |
| JP | 2000260446 | 9/2000 |
| JP | 2000287546 | 10/2000 |
| JP | 2000297656 | 10/2000 |
| JP | 2000302405 | 10/2000 |
| JP | 2000331698 | 11/2000 |
| JP | 2000340247 | 12/2000 |
| JP | 2001023677 | 1/2001 |
| JP | 2001106503 | 4/2001 |
| JP | 2001139304 | 5/2001 |
| JP | 2001219271 | 8/2001 |
| JP | 2001229946 | 8/2001 |
| WO | 9200380 | 1/1992 |
| WO | 0003126 | 1/2000 |
| WO | 0117896 | 3/2001 |
| WO | 0165621 | 9/2001 |
| WO | 0183364 | 11/2001 |

* cited by examiner

PROCESS FOR GENERATING ELECTRICITY WITH A HYDROGEN FUEL CELL

FIELD OF THE INVENTION

The present invention relates generally to the field of hydrogen fuel cells for producing electricity; and, indirectly, to the reduction of the greenhouse effect. More particularly, it concerns a process and an apparatus for generating electricity by using a hydrogen fuel cell combined with an enzymatic system adapted to catalyse the transformation of dissolved $CO_2$ into bicarbonate ions and hydrogen ions and with means for transforming the hydrogen ions into gaseous hydrogen that is supplied to the hydrogen fuel cell.

BACKGROUND OF THE INVENTION

Fuel Cell

A fuel cell is an electrochemical device in which the energy of a chemical reaction is converted directly into electricity. Unlike an electric cell or battery, a fuel cell does not run down or require recharging; it operates as long as the fuel and an oxidizer are supplied continuously from outside the cell.

A fuel cell consists of an anode to which fuel, commonly hydrogen, or methanol, is supplied; and a cathode-to which an oxidant, commonly air or oxygen, is supplied. The two electrodes of a fuel cell are separated by an ionic conductor electrolyte. In the case of a hydrogen-oxygen fuel cell with an alkali metal hydroxide electrolyte, the anode reaction is $2H_2 + 4OH^- \rightarrow 4H_2O + 4e$ and the cathode reaction is $O_2 + 2H_2O + 4e \rightarrow 4OH^-$. The electrons generated at the anode move through an external circuit containing the load and pass to the cathode. The OH— ions generated at the cathode are conducted by the electrolyte to the anode, where they form water by combining with hydrogen. The water produced at the anode is removed continuously in order to avoid flooding the cell. Hydrogen-oxygen fuel cells using ion exchange membranes or immobilized phosphoric acid electrolytes found early use in the Gemini and Apollo space programs, respectively.

Hydrogen Fuel Cell

The hydrogen fuel cell is an attractive replacement alternative to the internal combustion engine for producing electricity because it is both highly efficient and weakly polluting. The hydrogen fuel cell has existed for a long time and could produce an estimated 40% of the total energy demand within the next fifty years.

A conventional hydrogen fuel cell identified with numeral reference 10 is shown in FIG. 1. As shown, a hydrogen fuel cell mainly consists of two electrodes, an anode (2) and a cathode (4), separated by an electrolyte (6). At the anode (2), gaseous hydrogen liberates an electron and a positively charged ion. The electron transits through an external circuit (8) producing an electrical current while the ion diffuses through the electrolyte. At the cathode (4), the electrons combine with the hydrogen ions and oxygen to form water a non-polluting waste product that can be reused. A catalyst is used in order to accelerate this oxidizing reaction.

Hydrogen fuel cells are classified according to operating temperature and electrolyte type. There are five different categories of hydrogen fuel cells according to the type of electrolyte used: phosphoric acid; molten carbonate; solid oxide; proton-exchange membrane; and alkaline.

In order to implement hydrogen fuel cells in a day-to-day life, two technological obstacles must be overcome. The first concerns the cell itself and the second concerns the production, storage and transport of the hydrogen that is the energy vector of the process. Up to now, the development of the hydrogen fuel cell has leaped ahead while the hydrogen storage technology lags behind. This technological delay could very well be a determining factor in the marketability of hydrogen fuel cells.

Although hydrogen is a relatively widely present element in nature, it rarely presents itself as a readily available molecularly free gas. Hydrogen is therefore not considered as a source of energy per se, but rather as an energy vector. Various methods are available in order to produce hydrogen. Among these, there is the electrolysis of water or pyrol. However, the only profitable method at the present time is the production of hydrogen from fossil fuels.

Once produced, hydrogen may be stored as a liquid at extremely low temperatures or alternatively, under extremely high pressure. However, the high cost of this storing approach favours the use of a technology where the hydrogen is produced in place and at a production rate governed by its consumption rate. Hence, instead of storing liquid hydrogen, a liquid fuel containing hydrogen, for instance liquid hydrocarbons, is transported in place to be transformed in a later stage, and as needed, into hydrogen.

The presently available hydrogen fuel cell technology typically uses a liquid fuel containing hydrogen, for example diesel, gasoline, methanol, natural gas, etc. Such liquid fuel is converted by a reformer into a gaseous mixture of hydrogen and carbon dioxide. Then, the hydrogen is extracted from the gaseous mixture and supplied to the hydrogen fuel cell.

Methanol, for example, which is in liquid form at room temperature, contains a large quantity of hydrogen that may be chemically extracted. The process used to convert hydrocarbons such as methanol into hydrogen and carbon is internal or external reforming. Partial oxidizing and autothermic reforming are other physico-chemical processes that allow for separation of hydrogen from hydrocarbons. Vapour reforming of hydrocarbons (crude or refined oil, natural gas or gasified coal) yields hydrogen-rich mixtures that must be treated further in order to remove carbon monoxide and carbon dioxide which hinder the operation of certain hydrogen fuel cells.

The vapour reforming of natural gas involves the catalysed endothermic conversion of light hydrocarbons (including methane through gasoline) with water vapour. The industrial process usually occurs at 850° C., under 2.5 mPa of pressure, according to the following equation:

$$C_nH_m + nH_2O \Rightarrow nCO + (n+m/2)H_2 \qquad (I)$$

where n is an integer equal or greater than 1;

m=2n+2.

The catalyzed exothermic conversion (shift reaction) of the carbon monoxide by-product produces hydrogen according to the following equation:

$$CO + H_2O \Rightarrow CO_2 + H_2 \qquad (II)$$

The $CO_2$ is separated from the gas mixture by absorption processes or membrane separation, and the hydrogen, before being transferred to the hydrogen fuel cell, is treated a second time in order to remove unwanted compounds. Presently, and despite the important costs linked to its extraction, the carbon dioxide is generally released into the atmosphere, thereby contributing to the increase of the greenhouse effect.

The partial oxidizing of heavy hydrocarbons involves the exothermic or autothermic conversion of heavy hydrocarbons in the presence of oxygen and water vapour. The following equation describes the phenomenon:

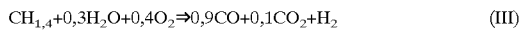

$$CH_{1.4}+0.3H_2O+0.4O_2 \Rightarrow 0.9CO+0.1CO_2+H_2 \qquad (III)$$

The partial oxidizing of coal, except for the initial preparation of coal, follows the same process as the one used for the gasification of heavy hydrocarbons. By-products also include $CO_2$.

Although hydrogen fuel cell technologies presently pollute less than internal combustion engines, these systems when combined with hydrocarbon reforming for example, still produce $CO_2$, the greatest contributor in terms of volume to the greenhouse effect. The growing concerns over climatic changes add to the pressures aimed at reducing such emissions which contribute to the greenhouse effect. The aforementioned need for decarbonization of hydrocarbons during reforming is but one example that warrants the use of a carbon dioxide separation and sequestration technology in order to avoid $CO_2$ dumping into the environment. Also, the presence of all the non-hydrogenated contaminants in the fuel decreases the hydrogen fuel cell's power and efficiency.

There already exists, in the prior art, a large number of processes for the production of electricity which are based on the hydrogen fuel cell concept. Among these, many rely on a typically less polluting process than the internal combustion engine but still dump gaseous $CO_2$ back into the atmosphere (JP2001-229946; JP11-229167; WO 01/23302; U.S. Pat. Nos. 6,299,744; 5,746,985) or into the water (U.S. Pat. No. 5,141,823).

Literature abounds with a substantial number of systems integrating a treatment intended to reduce $CO_2$ emissions by these types of cells. The United States government already uses this technology for certain space applications and intends of providing such a system for a future Mars mission (U.S. Pat. No. 5,005,787). The carbon dioxide produced by the crew and the hydrogen fuel cell would be introduced into a greenhouse and in return, the oxygen-charged air would be recirculated back into the living quarters and cabins. Japanese documents JP2000-287546, JP11-275965, and JP06-333589 also propose a similar solution in order to definitely remedy the $CO_2$ emission problem stemming from hydrogen fuel cell operation.

$CO_2$ recycling is also proposed in other applications, often depending on the type of cell used. CA 2,326,024 and JP2001-219271, for example, suggest the recycling of $CO_2$ and its use as a shielding gas during an arc welding process. The molten carbonate cells are a particular case in which $CO_2$ is used in order to enrich the oxidant at the cathode. A number of these technologies aim to convert CO into $CO_2$ first (JP2000-340247; JP2000-302405; JP2000-251918; JP11-199202; TW 432,741), and then to recycle this $CO_2$ toward the hydrogen fuel cell's cathode (JP2000-331698; JP2000-260446; JP11-162488; JP11-067251; JP06-275291; JP02-301968; CA 2,002,227/Absorption).

Some designers wager on a slightly different know-how, namely the methanation of $CO_2$ (JP04-190831; JP08-069808; WO 01/04045; U.S. Pat. Nos. 5,997,594; 6,221,117). Thus reconversion of carbon dioxide into $CH_4$ permits the recycling of carbon and hydrogen by conventional hydrogen fuel cells. U.S. Pat. No. 6,187,465 puts forward a means for recirculating $CO_2$ for a hydrogen fuel cell without any unwanted emissions.

Adsorption is a <<classic>> which invariably sustains interest. Zeolites (JP08-069808; EP 0 700 107) occupy a substantial part of this consideration, but other systems also attract attention such as JP09-204925 which uses an ionic resin. The separation of gaseous hydrogen by way of a porous membrane or surface (JP2001-139304/zirconate; CA 2,322,871) allows for the extraction of $CO_2$ which may then be stocked (WO 01/83364), recycled or discarded (U.S. Pat. No. 5,759,712). There is also the PSA (Pressure Swing Adsorption) described for example in JP10-027621; JP62-274561; and U.S. Pat. No. 6,299,994.

Obviously, the separation and sequestration of $CO_2$ remain a largely explored area covering a realm of possibilities. In view of the fact that carbon dioxide reduces the performance of hydrogen fuel cells, numerous processes include either a $CO_2$ <<separation unit>> (JP62-170171; U.S. Pat. No. 5,248,567; CA 2,332,079), a $CO_2$ <<separation apparatus>> (JP06-044993; JP07-169482; JP04-337252; WO 00/03126), or what is known as a <<scrubbing device>> (WO 01/25140; EP 0 677 883; U.S. Pat. No. 4,537,839; JP59-184468). Finally, JP11-162495 refers to a <<decarbonation system>>.

Absorption of exhaust fumes is another method which sustains keen interest among many inventors as a number of patents/patent applications demonstrate (JP02-206689; JP60-035470; JP60-241673; JP2001-106503/aqueous sodium hydroxide; JP2001-023677/water or alkaline solution; EP 0 376 219) (JP2000-297656; JP04-190831; JP04-051464; WO 01/04045; WO 01/17896; WO 01/23302; WO 01/65621; CA 1,291,787). Although different means have been employed, the cornerstone of innovation in this field remains the improvement of the solubilization of the gas in question.

Also known in the prior art, there are processes aiming at reducing $CO_2$ emissions in general. Examples of those processes are given in U.S. Pat. Nos. 5,514,378; 6,143,556; CA 2,222,030; 6,258,335; and EP 0 991 462.

U.S. Pat. No. 5,514,378 discloses a process for the reduction of $CO_2$ emissions in an enzymatic photobioreactor using carbonic anhydrase. Carbonic anhydrase is a very reactive enzyme that is common to most animal and plant species and hence, readily available. Trachtenberg (U.S. Pat. No. 6,143,556; CA 2,222,030) describes a system for the treatment of exhaust fumes with an enzyme that may be carbonic anhydrase, but does not suggest any specific application with respect to hydrogen fuel cells. The University of Michigan presents a photobioreactor for the treatment of $CO_2$ with carbonic anhydrase for a medical application as an artificial lung (WO 92/00380; U.S. Pat. No. 5,614,378).

U.S. Pat. No. 6,258,335 discloses a catalytic process for the removal of exhaust $CO_2$ through chemical fixation. This process comprises the optional use of carbonic anhydrase without any particular consideration for reforming exhaust. Materials Technology Corporation (U.S. Pat. No. 4,743,545) presents a bioreactor with a catalyst, that may be carbonic anhydrase, included inside of a hollow bead.

EP 0 991 462 in the name of the applicant discloses a counter-current-packed-column for $CO_2$ treatment. In this process, carbonic anhydrase is used in free or immobilized states.

U.S. Pat. No. 6,110,370 discloses a process where carbonic anhydrase is used to treat water and U.S. Pat. Nos. 4,602,987; 4,761,209; CA 1,294,758 in the name of Aquanautics Technology Corporation disclose a method for extracting and using oxygen from fluids. This system includes a step for the separation of $CO_2$ by using the carbonic anhydrase enzyme and an electrochemical cell.

Although a lot of efforts have been put forward in the development and improvement of hydrogen fuel cell in terms of production and storage of the hydrogen fuel, and in terms of reduction of $CO_2$ emissions, there is still place for improvements in this field. More particularly, there is still a need for a process or an apparatus that would provide a simple and affordable way of producing the required fuel, hydrogen; and that without further polluting the atmosphere with $CO_2$ emissions.

SUMMARY OF THE INVENTION

An object of the present invention is to provide a process and an apparatus that will satisfy this above-mentioned need.

In accordance with the present invention, this object is achieved with the combination of a hydrogen fuel cell with an enzymatic $CO_2$ transformation and sequestration process adapted to produce hydrogen. The result of this combination is an environmentally safe zero-emission electricity production system that may use hydrocarbons for its operation.

More particularly, the present invention proposes a process for generating electricity, comprising the steps of: a) providing a hydrogen fuel cell requiring gaseous hydrogen to generate electricity; b) catalysing a hydration reaction of $CO_2$ to produce a solution containing bicarbonate ions and hydrogen ions; c) combining the hydrogen ions of step b) to form gaseous hydrogen; and d) supplying the gaseous hydrogen obtained in step c) to the hydrogen fuel cell to generate electricity. The combining step c) preferably comprises the step of adding to the solution of bicarbonate ions and hydrogen ions an electron donor, for instance a metal selected from the group comprising zinc, magnesium, copper, aluminum, iron and tin.

It is worth mentioning that by hydration reaction of $CO_2$ it is meant the chemical reaction where water combines to $CO_2$ to produce $H_2CO_3$. Then, the $H_2CO_3$ so produced ionizes to give the solution containing $H^+$ and $HCO_3^-$.

The hydration of step b) is preferably catalysed by means of an enzyme capable of catalysing the hydration of $CO_2$ into hydrogen ions and bicarbonate ions. More preferably, the enzyme is carbonic anhydrase or an analogue thereof. In this regard, it is worth mentioning that one molecule of carbonic anhydrase can hydrate 36,000,000 molecules of carbon dioxide in a period of sixty seconds.

As can be appreciated, the process according to the invention proposes a simple and non-polluting way to produce in place the fuel required to operate a hydrogen fuel cell.

In accordance with a preferred aspect of the invention, which increases even more the efficiency of the hydrogen fuel cell in terms of the electricity generated, the process further comprises the steps of:

reforming hydrocarbons to yield a gaseous mixture comprising hydrogen and $CO_2$; and extracting gaseous hydrogen from the mixture and supplying the gaseous hydrogen to the hydrogen fuel cell.

Further preferably, and in order to reduce the $CO_2$ emission, the $CO_2$ produced in the reforming of hydrocarbons is recycled into the process. Hence, in this case, the process further comprises the steps of extracting gaseous $CO_2$ from the gaseous mixture and then recycling at least a portion, preferably the whole, of the extracted gaseous $CO_2$ in the catalysing step b) mentioned above.

In this case, the step b) of catalysing comprises the steps of feeding liquid $H_2O$ and the extracted gaseous $CO_2$ coming from the reforming of hydrocarbon into a bioreactor containing therein a reaction chamber filled with carbonic anhydrase. Also the water, which is generated by the hydrogen fuel cell, can advantageously be recycled and used in the catalysing step b).

The present invention also concerns an electrical energy generating apparatus comprising: a hydrogen fuel cell requiring gaseous hydrogen to generate an electrical output; catalysing means for catalysing a hydration reaction of $CO_2$ to produce a solution of bicarbonate ions and hydrogen ions; a combiner to combine the hydrogen ions into gaseous hydrogen; and a first transfer means for transferring the gaseous hydrogen from the combiner to the hydrogen fuel cell.

The present invention will be better understood by referring to the following figure and accompanying description.

DETAILED DESCRIPTION OF A PREFERRED EMBODIMENT

Figure 1:
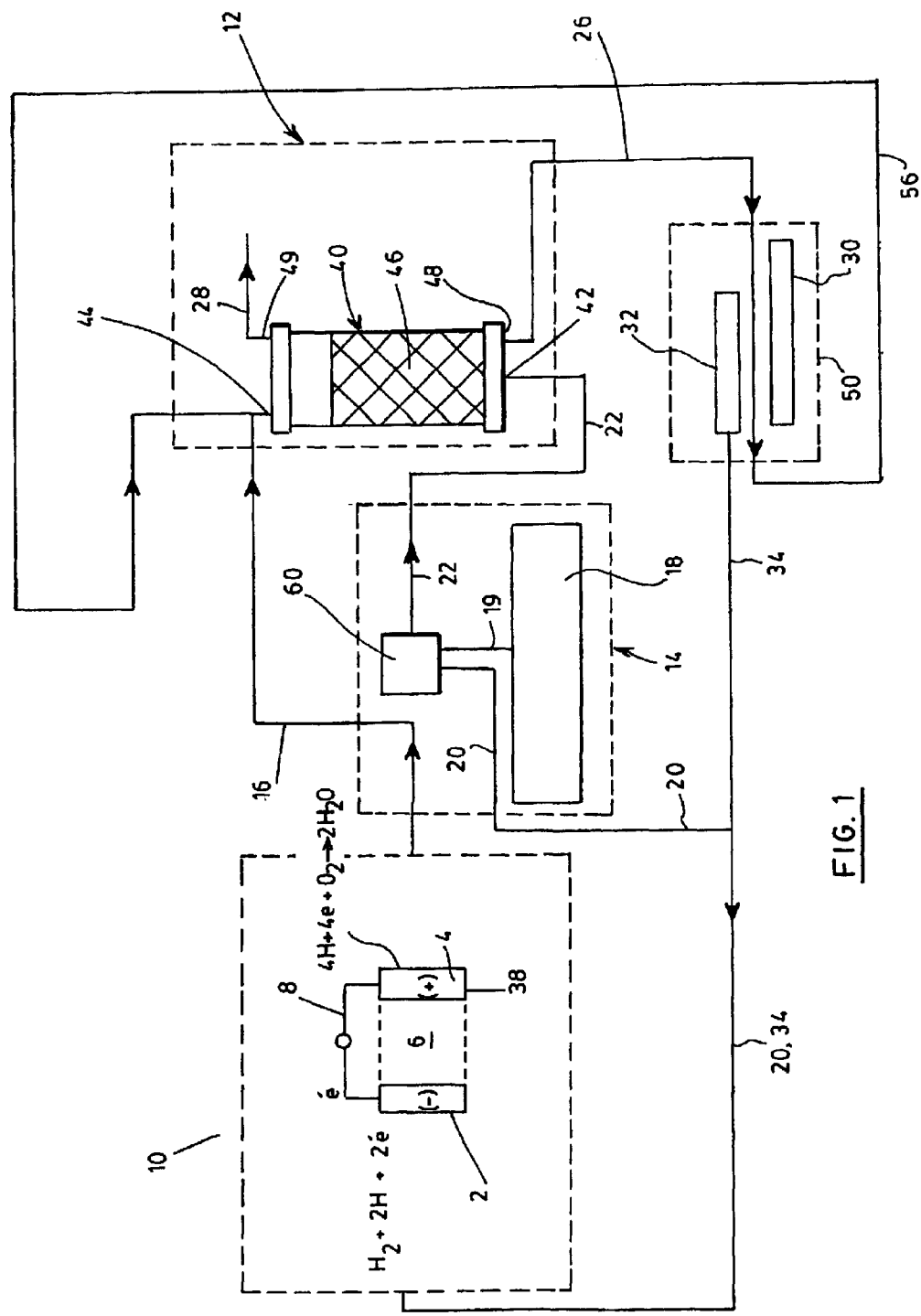
FIG. 1 is a schematic representation of a preferred embodiment of the process according to the present invention, showing the coupling of the enzymatic system with the hydrogen fuel cell as a closed loop, using gaseous $CO_2$ emissions from methane reforming.

Referring to FIG. 1, the process according to a preferred embodiment of the invention involves the coupling of a hydrogen fuel cell (10) to an enzymatic $CO_2$ transformation and sequestration system (12). Gaseous emissions from processes such as hydrocarbon reforming (14) are transformed into bicarbonates and hydrogen ions by the enzymatic system (12) in order to prevent their contribution to the greenhouse effect. The hydrogen ions resulting from the enzymatic system (12) are recovered and combined in order to supply the hydrogen fuel cell (10). Finally, water (16), a by-product of the oxidizing reaction of the hydrogen fuel cell (10) is recovered and recycled back into the enzymatic system (12).

More specifically, hydrocarbons, such as methane, fuel a reformer (18) which produces a gaseous mixture (19) containing hydrogen (20) and gaseous carbon dioxide ($CO_2$) (22). The gaseous carbon dioxide (22) is then led into the enzymatic system (12) where gas/liquid/enzyme contacts occur. At the output end of the enzymatic system (12), two phases are present: a liquid phase which is a solution (26) containing water, bicarbonate and hydrogen ions, and a gas phase (28) rid of $CO_2$.

The bicarbonate and hydrogen ions are removed from the solution (26) by precipitation (30) and combination (32) processes respectively. The hydrogen (34) produced by the combination process (32) is incorporated with the hydrogen (20) produced by the reformer (18), all the hydrogen (36) is led to the hydrogen fuel cell (10) in order to supply the same.

In the hydrogen fuel cell (10), hydrogen oxidizing with oxygen produces electricity, heat and water (16).

The enzymatic system (12), the combination and precipitation steps (32,30) and the reforming step (14) will now be described in further details.

Enzymatic System (12)

The enzymatic system (12) preferably consists of a bioreactor (40) comprising a gas inlet (42) to receive a gas containing $CO_2$ and a liquid inlet (44) to receive an aqueous liquid, which preferably comes from the hydrogen fuel cell (10) or from another source. As shown in FIG. 1, the gas containing $CO_2$ preferably comes from the reformer (18) or from another source. The bioreactor (40) further comprises a reaction chamber (46) in fluid communication with the gas inlet (42) and the liquid inlet (44). The reaction chamber (46) contains enzymes capable of catalysing the hydration of dissolved $CO_2$ into bicarbonate ions and hydrogen ions. The enzymes, which are preferably carbonic anhydrase or an analogue thereof, are either immobilised on or entrapped in a support filling the reaction chamber (46). The bioreactor (40) also comprises a liquid outlet (48) in fluid communication with the reaction chamber (46) for discharging the solution (26) of bicarbonate ions and hydrogen ions and a gas outlet (49) for discharging the gas (28) which does not contain carbon dioxide.

An enzymatic system as the one described in WO 98/55210 may advantageously be used for performing the process of the present invention. This system allows for the transformation of gaseous $CO_2$ into bicarbonate and hydrogen ions. The transformation of $CO_2$ into bicarbonate ions, usually a slow naturally occurring process, is catalysed by an enzyme which is in an immobilised or free state inside the reaction chamber (46) of the bioreactor (40). The equilibrium reaction must undergo an intermediate hydration that slows the transformation of $CO_2$ into bicarbonate ions. The enzymatic system (12) catalyses this hydration of dissolved carbon dioxide. The following equations describe the relevant processes:

$$\text{without enzyme: dissolved } CO_2 \Rightarrow H_2CO_3 \Rightarrow H^+ + HCO_3^- \quad \text{(IV)}$$

$$\text{with enzyme: dissolved } CO_2 \Rightarrow H^+ + HCO_3^- \quad \text{(V)}$$

Combination and Precipitation Steps (32,30)

The combination step (32) of the process, wherein $H^+$ ions produced in the bioreactor (40) are combined into $H_2$, is preferably performed in a reaction tank (50) containing therein a combiner, which is essentially made up of electron donors. For the combination reaction to occur, the combiner is added to the solution (26) of bicarbonate ions and hydrogen ions obtained in the bioreactor (40). Preferably, these electron donors are metals which are even more preferably selected from the group comprising zinc, magnesium, copper, aluminum, iron, tin or any other electron donor metal. The resulting hydrogen (34) is led to the hydrogen fuel cell (10) via a pipe or any conventional transfer means used to transfer a gas such as hydrogen. The following equation describes the combination process:

$$\text{Combination: } 2H^+ + 2e^- \Rightarrow H_2 \quad \text{(VI).}$$

The precipitation step (30) of the process, wherein the bicarbonate ions are removed from the solution (26) coming from the bioreactor (40), is preferably performed in the reaction tank (50) in which metal ions are added and the pH is adjusted to precipitate a bicarbonate (or a carbonate, depending on the case) of the metal. The metal ions used are preferably selected from the group consisting of $Ca^{++}$, $Ba^{++}$, $Mg^{++}$ and $Na^+$ ions. The result of this precipitation reaction (30) is the formation of the carbonate or bicarbonate of the metal used. It is worth mentioning that any other ions capable of precipitating the bicarbonate ions could be used without departing from the scope of the present invention.

A man skilled in the art will understand that the combination step (32) and the precipitation step (30) which are performed inside a single reaction tank (50) in the illustrated embodiment, may also be performed in two separate tanks without departing from the spirit of the invention.

A pipe or any other transfer means known in the art is provided to transfer the solution (26) of bicarbonate ions and hydrogen ions from the liquid outlet (48) of the bioreactor (40) to the reaction tank (50).

As apparent to a person skilled in the art, one by-product of the precipitation and combination steps is water (56). This water can advantageously be recycled into the process. For example, it could be used to feed the bioreactor (40). For this purpose the apparatus comprises a pipe or any other transfer means known in the art, to transfer the water (56) from the reaction tank (50) to the liquid inlet (44) of the bioreactor (40).

As can be appreciated, the coupling of the enzymatic system (12) to the hydrogen fuel cell (10) allows for the recovery of hydrogen ions as energy vectors. One consequence of this process is to reduce the input of new raw materials required to fuel the hydrogen fuel cell (10).

Reforming Step (14)

As mentioned above, the process preferably comprises a reforming step (14) to further enhance the efficiency of the hydrogen fuel cell (10) in terms of the production of electricity. For this purpose, the apparatus used to perform the process comprises the reformer (18) to reform hydrocarbons, thus yielding a gaseous mixture (19) containing hydrogen (20) and $CO_2$ (22). Since that reformers are very well known in the prior art, it is believed that there is no need to further describe the same in details.

The apparatus further comprises an extraction device (60) adapted to extract separately the gaseous hydrogen (20) and the carbon dioxide (22) from the gaseous mixture (19). The extraction device (60) is preferably a hydrogen permeating filter (a hydrogen separating film).

Once extracted, the gaseous $CO_2$ (22), instead of being released in the atmosphere, is transferred to the gas inlet (42) of the bioreactor (40) to be transformed into the above described solution (26) of hydrogen ions and bicarbonate ions. Therefore, the process and/or the apparatus according to the invention does not produce any polluting emissions nor does it contribute to the greenhouse effect, since all the $CO_2$ (22) is recycled in the process and/or apparatus.

Once extracted, the hydrogen (20) is supplied to the hydrogen fuel cell (10) as the main fuel.

The gaseous mixture can also be fed directly to the gas inlet (42) of the bioreactor. The gas outlet of the bioreactor will then contain pure $H_2$ that is transferred to the fuel cell. Hence, the extraction device (60) is optional.

As apparent to any person skilled in the art, the apparatus used to perform the process further comprises a pipe to transfer the gaseous mixture (19) to the extraction device (60), a pipe to transfer the hydrogen (20) towards the hydrogen fuel cell (10) and a pipe to transfer the $CO_2$ (22) to the bioreactor (40). Any other transfer means known in the art to transfer or convey a gas can be used without departing from the scope of the present invention.

The hydrogen fuel cell (10) will produce pure water (16) as well as heat and electricity from the oxidation of hydrogen. This pure water (16) may be recycled and re-circulated into the bioreactor (40) via a pipe, or any other transfer means capable of transferring a liquid, to be used for the catalysing step b) of the process. Since the hydrogen fuel cell (10) produces more water than it consumes, water may also serve in another process, depending on the particular application, such as humidifying gases in the reformer (18) for the hydrocarbon reforming step. This type of coupling allows for 100% recovery of the hydrogen fuel cell (10) by-products and also reduces the input of new raw materials into the bioreactor (40).

A man skilled in the art will understand that the hydrogen (34) produced in the combiner (32) and the hydrogen (20)

produced in the reformer (18) may be combined together before reaching the fuel cell (10) as shown in FIG. 1 or they may not, without departing from the spirit of the invention. The same holds true for the water (16) coming from the fuel cell (10) and the water (56) from the reaction tank (50), which may be combined or not before reaching the liquid inlet (44) of the bioreactor (40).

The following example illustrates the invention, it is non-restrictive and it is given only for informative purposes. It is to be understood that the invention is not limited to the preferred embodiment described in detail herein nor is it intended to be limited by the following example. A man skilled in the art will understand that various changes may be effected without departing from the scope or spirit of the present invention.

EXAMPLE 1

Methane reforming is used as a primary energy source for a hydrogen fuel cell. During methane reforming according to equations (I) and (II), one mole of methane generates four moles of hydrogen and one mole of $CO_2$.

During the enzymatic process, according to equation (V), one mole of hydrogen ions (or one half mole of hydrogen) is produced for each mole of dissolved $CO_2$ that is removed.

Calculations are as follows:

1 kmole $CO_2$=44 kg $CO_2$
1 kmole H=½ kmole $H_2$=1 kg $H_2$
1 kg $H_2$/44 kg $CO_2$=0.0227 kg $H_2$ produced/kg $CO_2$ or 22.7 kg $H_2$ produced/ton $CO_2$ This hydrogen is used in a hydrogen fuel cell in order to produce electricity. The maximal theoretical energy produced by liquid hydrogen, assuming complete oxidizing, is 33 kWh per Kg of $H_2$. The hydrogen fuel cell process reaches an overall efficiency of 85% when thermal recovery is present which translates to the following:

33 kWh/kg $H_2$×85%=28.05 kWh/kg $H_2$
For every ton of $CO_2$ removed,
22.7 kg/ton $CO_2$×28.05 kWh/ton $CO_2$ The production of one kilowatt-hour from fossil fuel generates 154 g of carbon or 565 g of $CO_2$. The production of electricity from hydrogen and a hydrogen fuel cell does not generate any $CO_2$ emissions.

The data in Table 1 shows the energy production and $CO_2$ elimination results for an enzymatic process coupled to a hydrogen fuel cell, as well as the quantity of $CO_2$ which would be emitted if fossil fuels were used to produce the same amount of electricity.

The results demonstrate $CO_2$ elimination through the enzymatic process, and hydrogen recovery and transformation into non-polluting energy.

TABLE 1

$CO_2$ production and recovery data for a given quantity of energy produced by a hydrogen fuel cell coupled to an enzymatic system versus a conventional thermal station.

|  | $CH_4$ reforming and use of $H_2$ in a hydrogen fuel cell | Energy production by fossil fuels | Units |
|---|---|---|---|
| Methane to reform | 0.36 | — | T $CH_4$ |
| Hydrogen obtained | 0.182 | — | T $H_2$ |
| Energy obtained from $H_2$ | 5100 | — | kWh |

TABLE 1-continued $CO_2$ production and recovery data for a given quantity of energy produced by a hydrogen fuel cell coupled to an enzymatic system versus a conventional thermal station.

|  | $CH_4$ reforming and use of $H_2$ in a hydrogen fuel cell | Energy production by fossil fuels | Units |
|---|---|---|---|
| $CO_2$ produced by reforming | 1 | — | T $CO_2$ |
| $CO_2$ transformed by the enzymatic system | 1 | — | T $CO_2$ |
| $H_2$ produced by the enzymatic system | 0.0227 | — | T $H_2$ |
| Energy obtained from $H_2$ (enzymatic) | 637 | — | kWh |
| Total energy produced | 5737 | 5737 | kWh |
| Total $CO_2$ produced | 0 | 3.2 | T $CO_2$ |

Finally, the $CO_2$ is directed toward the enzymatic system which will transform it into calcium carbonate according to the following equations:

$$\text{dissolved } CO_2 \Leftrightarrow H^+ + HCO_3^- \quad (V)$$

$$HCO_3^- \Leftrightarrow H^+ + CO_3^{2-} \quad (VII)$$

$$CO_3^{2-} + Ca^{2+} \Leftrightarrow CaCO_3 \quad (VIII).$$

What is claimed is:

1. A process for generating electricity, comprising the steps of:
   a) providing a hydrogen fuel cell requiring gaseous hydrogen to generate electricity;
   b) catalysing a hydration reaction of $CO_2$ to produce a solution containing bicarbonate ions and hydrogen ions;
   c) combining the hydrogen ions of step b) to form gaseous hydrogen; and
   d) supplying the gaseous hydrogen obtained in step c) to the hydrogen fuel cell to generate electricity, wherein the process further comprises the steps of:
   reforming hydrocarbons to yield a gaseous mixture comprising hydrogen and $CO_2$; and
   extracting gaseous hydrogen from the mixture and supplying the gaseous hydrogen to the hydrogen fuel cell.

2. A process as claimed in claim 1, comprising the step of:
   extracting gaseous $CO_2$ from the mixture and recycling at least a portion of said extracted gaseous $CO_2$ in the catalysing step b).

3. A process as claimed in claim 2, wherein said hydration of step b) is catalysed by means of an enzyme capable of catalysing the hydration of dissolved $CO_2$ into hydrogen ions and bicarbonate ions.

4. A process as claimed in claim 3, wherein the enzyme is carbonic anhydrase or an analogue thereof.

5. A process as claimed in claims 4, wherein the enzyme is immobilised on or entrapped in a support.

6. A process as claimed in claim 5, wherein step b) of catalysing comprises the steps of:
   feeding liquid $H_2O$ and said at least portion of the extracted gaseous $CO_2$ into a bioreactor containing therein a reaction chamber filled with said carbonic anhydrase.

7. A process as claimed in claim 1, wherein the hydrogen fuel cell also generates, in step d), water that is recycled and used in the catalysing step b).

8. A process as claimed in claim 1, comprising the step of:
adding to the solution obtained in step b) metal ions, and adjusting the pH of the solution to precipitate a carbonate or a bicarbonate of said metal.

9. A process as claimed in claim 8, wherein the metal ions are selected from the group consisting of $Ca^{++}$, $Mg^{++}$, $Ba^{++}$, and $Na^{+}$.

10. A process as claimed in claim 1, wherein the combining step c) comprises the step of adding to the solution of bicarbonate ions and hydrogen ions obtained in step b) an electron donor.

11. A process as claimed in claim 10, wherein the electron donor is a metal.

12. A process as claimed in claim 11, wherein the metal is selected from the group comprising zinc, magnesium, copper, aluminum, iron and tin.

13. An electrical energy generating apparatus comprising:
a hydrogen fuel cell requiring gaseous hydrogen to generate an electrical output;
catalysing means for catalysing a hydration reaction of gaseous $CO_2$ to produce a solution of bicarbonate ions and hydrogen ions;
a combiner to combine said hydrogen ions into gaseous hydrogen;
a transfer means for transferring the gaseous hydrogen from the combiner to the hydrogen fuel cell.

14. An electrical energy apparatus as claimed in claim 13, wherein the means for catalysing the hydration of the $CO_2$ comprises a bioreactor comprising:
a gas inlet for receiving a gas containing $CO_2$,
a liquid inlet for receiving an aqueous liquid,
a reaction chamber in fluid communication with the gas inlet and the liquid inlet, the reaction chamber containing therein enzymes capable of catalysing the hydration of dissolved $CO_2$ into bicarbonate ions and hydrogen ions; and
a liquid outlet in fluid communication with the reaction chamber for discharging a solution of bicarbonate ions and hydrogen ions; and the apparatus comprises:
a transfer means for transferring the solution of bicarbonate ions and hydrogen ions from said liquid outlet to the combiner.

15. An electrical energy generating apparatus as claimed in claim 14, comprising:
a reformer to reform hydrocarbons, thus yielding a gaseous mixture containing hydrogen and $CO_2$;
an extracting means for extracting gaseous hydrogen from said gaseous mixture; and
a transfer means for transferring the gaseous hydrogen from said extracting means to the hydrogen fuel cell.

16. An electrical energy generating apparatus as claimed in claim 15, wherein the extracting means comprises means for extracting and separating gaseous $CO_2$ from the gaseous mixture, and the apparatus comprises a fourth transfer means for transferring the gaseous $CO_2$ from the extracting means to said gas inlet of the bioreactor.

17. An electrical energy generating apparatus as claimed in claim 16, wherein said enzyme is immobilised on or entrapped in a support filling the reaction chamber of the bioreactor.

18. An electrical energy generating apparatus as claimed in claim 17, wherein said enzyme is carbonic anhydrase or an analog thereof.

19. An electrical energy generating apparatus as claimed in claim 18, comprising:

a transfer means for transferring water produced in the hydrogen fuel cell to the liquid inlet of the bioreactor.

20. An electrical energy generating apparatus as claimed in claim 19, comprising means for reacting the bicarbonate ions, which are contained in said solution discharged from the bioreactor, with metal ions to precipitate the carbonate of said metal.

21. A process as claimed in claim 1, comprising the steps of:
reforming hydrocarbons to yield a gaseous mixture comprising hydrogen and $CO_2$; and
recycling the gaseous mixture to the catalysing step b).

22. An electrical energy generating apparatus as claimed in claim 14, comprising:
a reformer to reform hydrocarbons, thus yielding a gaseous mixture containing hydrogen and $CO_2$; and
a transfer means for transferring the gaseous mixture to the gas inlet of the bioreactor.

23. A process for generating electricity, comprising the steps of:
a) providing a hydrogen fuel cell requiring gaseous hydrogen to generate electricity;
b) catalysing a hydration reaction of $CO_2$ to produce a solution containing bicarbonate ions and hydrogen ions;
c) combining the hydrogen ions of step b) to form gaseous hydrogen; and
d) supplying the gaseous hydrogen obtained in step c) to the hydrogen fuel cell to generate electricity,
wherein the hydrogen fuel cell also generates, in step d), water that is recycled and used in the catalysing step b).

24. A process for generating electricity, comprising the steps of:
a) providing a hydrogen fuel cell requiring gaseous hydrogen to generate electricity;
b) catalysing a hydration reaction of $CO_2$ to produce a solution containing bicarbonate ions and hydrogen ions;
c) combining the hydrogen ions of step b) to form gaseous hydrogen; and
d) supplying the gaseous hydrogen obtained in step c) to the hydrogen fuel cell to generate electricity;
wherein the combining step c) comprises the step of adding to the solution of bicarbonate ions and hydrogen ions obtained in step b) an electron donor.

25. A process for generating electricity, comprising the steps of:
a) providing a hydrogen fuel cell requiring gaseous hydrogen to generate electricity;
b) catalysing a hydration reaction of $CO_2$ to produce a solution containing bicarbonate ions and hydrogen ions;
c) combining the hydrogen ions of step b) to form gaseous hydrogen; and
d) supplying the gaseous hydrogen obtained in step c) to the hydrogen fuel cell to generate electricity;
wherein the process further comprises the steps of:
reforming hydrocarbons to yield a gaseous mixture comprising hydrogen and $CO_2$; and
recycling the gaseous mixture to the catalysing step b).

* * * * *

UNITED STATES PATENT AND TRADEMARK OFFICE
CERTIFICATE OF CORRECTION

PATENT NO. : 6,846,584 B2
DATED : January 25, 2005
INVENTOR(S) : Frederic Dutil and Jean Ruel Page 1 of 1

It is certified that error appears in the above-identified patent and that said Letters Patent is hereby corrected as shown below:

Column 7,
Line 25, the equation numbered (IV) should read as follows:
-- without enzyme: dissolved $CO_2 \Leftrightarrow H_2CO_3 \Leftrightarrow H^+ + HCO_3^-$ (IV) --
Line 27, the equation numbered (V) should read as follows:
-- with enzyme: dissloved $CO_2 \Leftrightarrow H^+ + HCO_3^-$ (V) --

Column 10,
Line 23, the equation numbered (V) should read as follows:
-- dissolved $CO_2 \Leftrightarrow H^+ + HCO_3^-$ (V) --
Line 25, the equation numbered (VII) should read as follows:
-- $HCO_3^- \Rightarrow H^+ + CO_3^{2-}$ (VII) --
Line 27, the equation numbered (VIII) should read as follows:
-- $CO_3^{2-} + Ca^{2+} \Rightarrow CaCO_3$ (VIII)
Line 61, should read as follows:
-- feeding liquid $H_2O$ and said at least portion of the --

Signed and Sealed this

Thirty-first Day of May, 2005

JON W. DUDAS
*Director of the United States Patent and Trademark Office*